United States Patent
Silventoinen et al.

(10) Patent No.: US 6,345,183 B1
(45) Date of Patent: Feb. 5, 2002

(54) SIGNALLING METHOD AND A DIGITAL RADIO SYSTEM

(75) Inventors: Marko Silventoinen, Helsinki; Pekka A. Ranta, Nummela; Mika Raitola, Espoo, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/230,999
(22) PCT Filed: Aug. 5, 1997
(86) PCT No.: PCT/FI97/00465
  § 371 Date: Feb. 5, 1999
  § 102(e) Date: Feb. 5, 1999
(87) PCT Pub. No.: WO98/07291
  PCT Pub. Date: Feb. 19, 1998

(30) Foreign Application Priority Data

Aug. 9, 1996 (FI) .................................................. 963136

(51) Int. Cl.⁷ ................................................ H04Q 7/20
(52) U.S. Cl. ...................... 455/422; 455/522; 455/63; 455/515; 455/517
(58) Field of Search .................... 455/522, 561, 455/571, 572, 574, 575, 13.4, 504, 511, 517, 63, 70, 515; 370/509, 522, 527, 529

(56) References Cited

U.S. PATENT DOCUMENTS

| | | | |
|---|---|---|---|
| 54,992 A | * 5/1866 | Cooper | 370/95.1 |
| 4,956,851 A | 9/1990 | Wolensky et al. | |
| 5,333,175 A | * 7/1994 | Ariyavisitakul et al. | 379/58 |
| 5,479,444 A | * 12/1995 | Malkamaki et al. | |
| 5,483,550 A | * 1/1996 | Hulbert | 375/202 |
| 5,570,353 A | * 10/1996 | Keskitalo et al. | 370/18 |
| 5,583,870 A | * 12/1996 | Delprat | 370/337 |
| 5,648,955 A | * 7/1997 | Jensen et al. | 370/252 |
| 5,761,292 A | * 6/1998 | Wagner et al. | 379/229 |
| 5,936,961 A | * 8/1999 | Chiodini et al. | 370/441 |
| 5,956,649 A | * 9/1999 | Mitra et al. | 455/522 |
| 6,011,820 A | * 1/2000 | Rosengren | 375/354 |

FOREIGN PATENT DOCUMENTS

| | | |
|---|---|---|
| EP | 0 701 334 | 3/1996 |
| EP | 0 724 342 | 7/1996 |
| GB | 2 297 669 | 8/1996 |
| WO | WO 95/12957 | 5/1995 |

OTHER PUBLICATIONS

Silventoinen, et al., IEEE 47th Vehicular Technology Conference, "Fast Power Control for GSM HBS Using Training Sequences", vol. 3, p. 1689–1694.
Copy of International Search Report for PCT/FI97/00465.
Copy of the International Preliminary Examination Report for PCT/FI97/00465.

* cited by examiner

Primary Examiner—Daniel Hunter
Assistant Examiner—Yemane Woldetatios
(74) Attorney, Agent, or Firm—Altera Law Group, LLC

(57) ABSTRACT

A method and a system in a digital radio system for signalling between a base station and a subscriber terminal. The signals transmitted over the radio connection between the base station and the subscriber terminal comprise bursts consisting of symbols. The bursts comprise a known training sequence. According to the invention, the training sequence is used for signalling. By the invention, it is possible to implement signalling related to power control of the base station or the subscriber terminal, or in packet transfer, the numbering of bursts, packets or other data blocks.

20 Claims, 1 Drawing Sheet

SIGNALLING METHOD AND A DIGITAL RADIO SYSTEM

FIELD OF THE INVENTION

The present invention relates to a method in a digital radio system for signalling between a base station and a subscriber terminal, in which the signals transmitted over the radio connection between the base station and the subscriber terminal comprise bursts consisting of symbols, said bursts comprising a known training sequence.

PRIOR ART

In a radio system, two kinds of signallings are employed: signalling that is related to a specific call, and signalling that takes place independent of the call.

Call-related signalling takes place at the same time as the user's data flow is being transferred. Prior art in such a case knows two options for the transmission path: SACCH and FACCH. SACCH is a low-rate, separate channel associated with each traffic channel. Due to its low rate, it may only be used for non-urgent signalling, e.g. for transmitting measurement results concerning the radio path. FACCH is signalling within the traffic channel. Due to its high rate, it may be employed for a more time-critical signalling, e.g. for authenticating a subscriber, or for signalling associated with a handover. A major drawback is that when occurring during a call, the FACCH has priority over the user's data flow, whereby user information will be lost, which results in a similar outcome as errors in the transmission.

Call-independent signalling takes place when there is need to set up a connection between a base station and a subscriber terminal only for signalling purposes, e.g. for conveying short messages. In prior art solutions, traffic channels may be used for this, either at half or full rate. However, this means that resources are wasted, as the channels are in such a case normally used for transmitting but a few messages and only for a very short time. As a consequence, SDCCH has been developed, having the rate as low as one eighth of that of a normal traffic channel. This channel may be used also for e.g. a slow data transmission service, but that leads to the problem met in the FACCH signalling: user data flow may be lost due to signalling having a priority over it.

The following discusses transferring a transmitting power control command from a base station to a subscriber terminal. The simplest way of implementation is to define a power control bit. Depending on the value of the bit, the transmitting power is either reduced or increased. Additionally are needed several error correction bits, which are used to ensure that also during a bad radio connection the correct command can be conveyed. This is most important, because during a bad radio connection one way of remedy is to increase the transmitting power. In practice, if this is carried out by e.g. FACCH signalling, at least three bits per burst are needed for the transmission of the transmitting power control command and the associated error correction bits. This results in a traffic requirement of at least 650 bit/s, which is off the capacity that would be needed on the traffic channel for transferring the user's data flow.

A training sequence refers to a group of predetermined symbols known by the receiver. By comparing the received training sequence by means of specific methods to the known training sequence, the receiver is able to deduct what kind of distortions, caused by a non-ideal radio connection between the base station and the subscriber terminal, are present in the received signal, and by utilizing this information the receiver may more easily demodulate the received signal.

The severest drawbacks of the prior art thus have to do with the low rate of signalling and disturbance it causes to the transfer of user data flow, or the obstacles it creates to developing new services in the future.

CHARACTERISTICS OF THE INVENTION

It is consequently the object of the present invention to implement a signalling method by means of which the aforementioned drawbacks may be avoided.

This is achieved with a method of the type set forth in the introduction, characterized in that a training sequence is used for signalling.

The invention further relates to a digital radio system for signalling between a base station and a subscriber terminal, in which the signals transmitted over the radio connection between the base station and the subscriber terminal comprise bursts consisting of symbols, said bursts comprising a known training sequence, the system having at least one transmitter and at least one receiver, of which the transmitter has means for inserting the training sequence in the signal to be transmitted, and of which the receiver has means that may be employed for identifying the training sequence in the received signal, characterized in that the transmitter comprises means which, when used for data transmission, convert data to be presented as a predetermined training sequence, and the receiver comprises means for converting the training sequence identified in the received signal into the data that was intended to be transmitted to it.

The method of the invention provides a plurality of advantages. A most significant advantage is obtained by the fact that the rate of the traffic channel will not decrease; its payload may thus be used entirely for transferring the user data flow. Consequently, as regards the user, there is no interference caused by the traffic channel being used for signalling.

Another most useful characteristic stems from the reliability of the signalling. As the signalling information is coded into a training sequence, its error-free transfer from a base station to a subscriber terminal is most reliable as a result of the advanced methods used for identifying the training sequence.

It is a further advantage of the solution that it is possible in the future to develop new services that employ low-rate transmission channels, and as signalling is not carried out on these channels, no disturbance will be generated, either.

DESCRIPTION OF THE DRAWINGS

In the following, the invention will be described in greater detail with reference to the examples in the accompanying drawings, in which.

DESCRIPTION OF THE PREFERRED EMBODIMENTS

Figure 1:
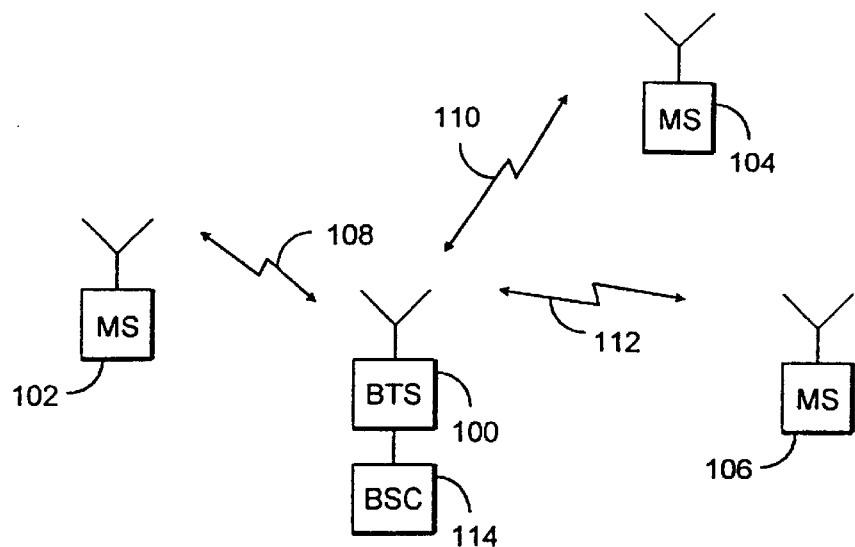
FIG. 1 illustrates a digital radio system in which the method according to the invention may be applied.

The method and receiver according to the invention may be applied in any digital radio system in which signals to be transmitted comprise bursts made up of symbols, the bursts comprising a known training sequence. FIG. 1 shows by way of example the essential parts of the structure of a typical cellular radio system. The system comprises a base station 100, and a group of usually mobile subscriber terminals 102–106 that have a two-way connection 108–112 to the base station 100. The base station 100 forwards the connections of the terminals 102–106 to a base station controller 114, which forwards them to other parts of the system and to the fixed network. The base station controller 114 controls the operation of one or more base stations 100.

Figure 2:
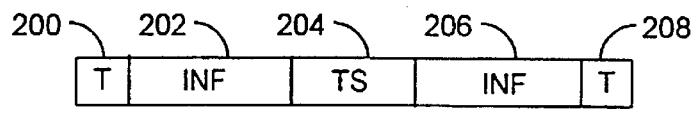
FIG. 2 illustrates the structure of a normal burst in the GSM system, having a training sequence in the middle.

In digital radio systems, it is possible to insert into signal bursts a predetermined symbol sequence, a training sequence, by means of which e.g. the impulse response may be calculated. FIG. 2 illustrates by way of example the normal burst in the digital GSM cellular radio system. The normal burst in the GSM system comprises 148 symbols in all. The symbols comprise bits or combinations of bits. The symbols of a burst are in blocks comprising 3 start symbols 200, 58 information symbols 202, 26 training symbols 204, 58 information symbols 206, and 3 end symbols 208. Thus, the training sequence in the GSM normal burst is 26 symbols in length.

In the following, the inventive method will be examined. It may be used in a digital radio system for signalling between a base station 100 and subscriber terminal 102–106, in which the signals to be transmitted over the radio connection 108–112 between the base station and the subscriber terminal comprise bursts consisting of symbols, said bursts comprising a known training sequence 204. The basic invention of the method is that the training sequence 204 is used to represent the symbol indicating the information that is desired to be transmitted between the base station 100 and the subscriber terminal 102–106. If two different training sequences 204 have been issued for the connection 108–112 between the base station 100 and the subscriber terminal 102–106, the symbol indicative of the information transmitted may have two different values, e.g. 0 and 1. If more than two different training sequences 204 are in use, the symbol indicative of the information to be transmitted may obtain as many different values as there are training sequences 204 in use.

Figure 3:
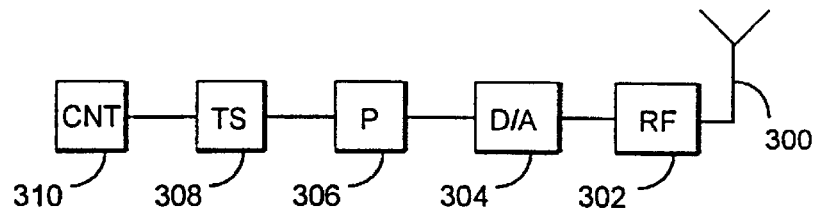
FIG. 3 illustrates an example of the essential parts in the structure of the inventive transmitter.

The following describes in closer detail the structure of the transmitter in the inventive radio system, the essential parts of such a transmitter being shown in the block diagram of FIG. 3. The transmitter comprises means 310 that contain the information to be transmitted. In the means 310, the information to be transmitted is coded according the method of the invention into a predetermined training sequence 204 which is applied to means 308 in which it is incorporated into the signal to be transmitted. From thereon, the transmitter operates according to prior art. Next, the signal is applied to processing means 306 in which the signal is modulated. The modulated signal is applied to conversion means 304 in which the signal is converted from digital to analog form. Then, the signal is applied to radio frequency parts 302 in which the signal is converted to the transmit frequency. Finally, the signal is fed to an antenna 300 and transmitted on the radio path to the second party of the connection 108–112. The above operations may be implemented by e.g. a general or signal processor, or by separate logic.

Figure 4:
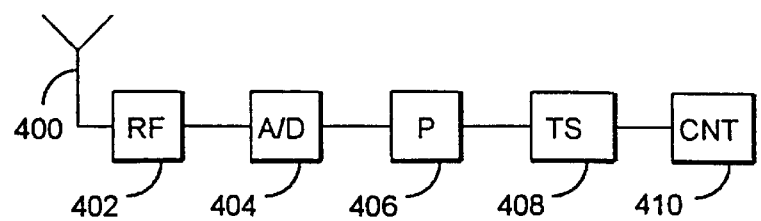
FIG. 4 illustrates an example of the essential parts in the structure of the inventive receiver.

Correspondingly, the essential parts of the structure of the receiver used in the inventive radio system are illustrated in the block diagram of FIG. 4. The receiver comprises an antenna 400 for receiving the signal from the radio connection 108–112, to be applied to radio frequency parts 402 in which the signal is converted to an intermediate frequency. From the radio frequency parts, the signal is applied to converting means 404 in which the signal is converted from analog to digital form. The digital signal proceeds to processing means 406, in which the signal may be e.g. filtered, demodulated, the channel impulse response and the energy thereof may be estimated, and the signal distorted on the channel may be restored back to the original data stream. The signal is then applied to means 408, by means of which it is possible to identify the identified training sequence 204 in the signal. The identified training sequence 204 is applied to processing means 410, by means of which it is possible to decode from it, according to the method of the invention, the information that was transmitted thereto. Then, the means 410 begin to execute those operations that were to be accomplished by the signalling in question. The above operations may be implemented by e.g. a general or signal processor, or by separate logic.

An advantageous use for the invention presented above is to carry out control of the subscriber terminal 102–106 transmitting power so that signalling is performed according to the method set forth. In such a case, two training sequences 204 have been provided for the connection 108–112 between the base station 100 and the subscriber terminal 102–106. One of the training sequences 204 is used by the base station 100 for commanding the subscriber terminal 102–106 to reduce its transmitting power, and the other to increase it. The means 310 contain the necessary deduction logic for deciding which of the two training sequences 204 given has to be applied to means 308 in which the training sequence is incorporated into the signal to be transmitted. Similarly, as soon as the subscriber terminal 102–106 has received the signal, it is applied to means 408 in which it is possible to separate the identified training sequence 204 in the signal. The means 410 comprise the necessary deduction logic for knowing whether the identified training sequence 204 signifies a transmitting power increase command, or a reduce command.

It should be pointed out that the preferred embodiment set forth above may also be implemented by using more than two different training sequences 204, each representing a control command of a specific level of transmitting power. For example, eight different training sequences 204 have been assigned to one connection 108–112, and it is consequently possible to transfer three bits of information in one burst: training sequence 1 corresponds to the bit combination 000, training sequence 2 corresponds to the bit combination 001, training sequence 3 corresponds to the bit combination 010, training sequence 4 corresponds to the bit combination 011, training sequence 5 corresponds to the bit combination 100, training sequence 6 corresponds to the bit combination 101, training sequence 7 corresponds to the bit combination 110, and training sequence 8 corresponds to the bit combination 111.

Another way of using more than two different training sequences 204 is to provide each training sequence 204 with a relative power control value instead of absolute transmitting power. For example, if four different training sequences 204 are used, training sequence 1 signifies "increase power by one unit", training sequence 2 "increase power by three units", training sequence 3 "reduce power by one unit", and training sequence 4 "reduce power by three units".

In principle, the GSM system has no reason why there could not be more than eight different training sequences 204; then, the inventive method could be used for transferring signalling information of more than three bits.

This would, however, require a change in the specifications of the GSM system.

Another preferred embodiment for the invention is to carry out the transmitting power control of the base station 100 by carrying out signalling according to the method set forth.

Further, the other adjustable parameters of the base station 100 and the subscriber terminal 102–106 may be advantageously adjustable by using the method presented.

An advantageous embodiment for the present invention is to use it in packet transfer for numbering bursts, packets or other data blocks. In packet transfer, a connection is set up between users by transmitting data as packets that contain in addition to the actual information also address and control information. A plurality of connections may use the same transfer connection at the same time. In recent years, research has been conducted to using packet-switched radio systems for data transfer in particular, because the packet switching method is well suited to e.g. data transfer required by use of inter-active computer programs, in which data to be transferred is produced as bursts. Consequently, there is no need to allocate the data transfer connection for the entire time, but only for the packet transfer.

The control information also comprises numbering of the bursts. The bursts have to be numbered so as to be able to detect if a burst has been lost entirely. The receiver is thus able to request the transmitter to send anew the burst provided with that number. Also, retransmission of a received but erroneous burst can be requested on the basis of its number.

The numbering of bursts may be implemented in many ways. The number of training sequences employed also has an influence on the use. In the minimum, two training sequences are enough. In such a case, two successive bursts have a different training sequence. The loss of one burst can be detected because that leads to the receiver receiving two bursts containing the same training sequence. The retransmission scheme may also be implemented. According to the number of the training sequences being used, the numbering may be developed: the bursts may be numbered by using e.g. 2–16 different training sequences. This signifies that 2–16 successive bursts each contains a different training sequence. It is easier to implement the retransmission scheme and the possible interleaving and coding of the packets the more numbers are in use.

A packet may be divided into several bursts. To take an example, it is assumed that a packet has been divided into four bursts. There are in such a case two main methods to carry out the numbering. According to the first of them, each burst has a dedicated training sequence, e.g. TS1–TS2–TS3–TS4. The receiving party may request any of the bursts to be retransmitted separately. Different variations may be developed from this. Two training sequences may be in use, whereby the numbering in the packet is carried out as TS1–TS2–TS1–TS2. Thus, the same training sequences are repeated in successive packets, and so the retransmission scheme cannot be extended to the previous received packet, unless more training sequences are in use. If, e.g., eight different training sequences are used, the numbering of four successive packets may be as follows: TS1–TS2–TS3–TS4, TS5–TS6–TS7–TS8, TS1–TS2–TS3–TS4, TS5–TS6–TS7–TS8.

Another way is to have a dedicated training sequence for each packet. It is again assumed that each packet has been divided into four bursts. In such a case, four successive packets may be numbered as follows: TSI-TS1-TS1-TS1, TS2-TS2-TS2-TS2, TS3-TS3-TS3-TS3, TS4-TS4-TS4-TS4, if four different training sequences are used. A retransmit request in such a case concerns an entire packet.

Although the invention is in the above described with reference to the examples in the accompanying drawings, it is obvious that the invention is not restricted thereto but it may be modified in many ways within the inventive idea of the attached claims.

What is claimed is:

1. A method in a digital radio system for signalling between a base station and a subscriber terminal, the method comprising:

transmitting signals over a radio connection between a base station and a subscriber terminal, the signals comprise bursts consisting of symbols, said bursts including a known training sequence, wherein the known training sequence being used for the signalling.

2. The method as claimed in claim 1, wherein each individual, different training sequence is used to represent a predetermined symbol to be transferred.

3. The method as claimed in claim 1, wherein each individual, different training sequence is used to represent a predetermined group of different symbols to be transferred.

4. The method as claimed in claim 1, wherein the method is used in association with a single connection for controlling transmitting power of the subscriber terminal.

5. The method as claimed in claim 4, wherein each connection is provided with two different training sequences, a first of which is used by the base station for commanding the subscriber terminal to reduce the subscriber terminal's transmitting power and a second to increase subscriber terminal's transmitting power.

6. The method as claimed in claim 4, wherein providing each connection with more than two different training sequences, each training sequence being used by the base station for commanding the subscriber terminal to set the subscriber terminal's transmitting power on a level defined by the information in the training sequence.

7. The method as claimed in claim 4, wherein each connection is provided with more than two different training sequences, part of the training sequences being employed by the base station for commanding the subscriber terminal to reduce the subscriber terminal's transmitting power so that each of the training sequences has a different effect for reducing the transmitting power by a predetermined number of units, and part of the training sequences being employed by the base station for commanding the subscriber terminal to increase its transmitting power so that each of the training sequences has a different effect of increasing the transmitting power by a predetermined number of units.

8. The method as claimed in claim 1, wherein the method is used in association with a single connection for controlling the transmitting power of the base station.

9. The method as claimed in claim 8, wherein each connection is provided with two different training sequences, a first of which is used by the subscriber terminal for commanding the base station to reduce the base station's transmitting power and a second to increase the base station's transmitting power.

10. The method as claimed in claim 8, wherein each connection is provided with more than two different training sequences, each of which being used by the subscriber terminal for commanding the base station to set the base station's transmitting power to a level defined by the information in the training sequence.

11. The method as claimed in claim 8, wherein each connection is provided with more than two different training sequences, part of the training sequences being employed by the subscriber terminal for commanding the base station to reduce the base station's transmitting power so that each of the training sequences has a different effect of reducing the transmitting power by a predetermined number of units, and part of the training sequences being employed by the subscriber terminal for commanding the base station to increase the base station's transmitting power so that each of the training sequences has a different effect of increasing the transmitting power by a predetermined number of units.

12. The method as claimed in claim 1, wherein the method is used in packet transfer for numbering bursts, packets or other data blocks.

13. The method as claimed in claim 12, wherein two successive bursts have a different training sequence.

14. The method as claimed in claim 12, wherein the packet consists of bursts, and the bursts of the packet each have the same training sequence, and two successive packets have a different training sequence.

15. A digital radio system for signalling between a base station and a subscriber terminal, the system comprising:

a radio connection between the base station and the subscriber terminal for transmitting signals over, comprises bursts consisting of symbols, said bursts comprising a known training sequence, at least one transmitter and at least one receiver, of which the transmitter has means for inserting the training sequence in the signal to be transmitted, and of which the receiver has means that is employed for identifying the training sequence in the received signal, wherein the transmitter comprises means which, when used for data transmission, convert data to be presented as a predetermined training sequence, and the receiver comprises means for converting the training sequence identified in the received signal into the information that was intended to be transmitted to the receiver.

16. The system as claimed in claim 15, wherein the transmitter of the base station comprises means which, when used for transferring a power control command relating to a single connection of the subscriber terminal to the subscriber terminal, convert the information to be presented as a predetermined training sequence, and the receiver of the subscriber terminal comprises means used for converting the training sequence identified in the received signal to a transmitting power control command that the base station transmits to the subscriber terminal.

17. The system as claimed in claim 15, wherein the transmitter of the subscriber terminal comprises means which, when used for transferring a power control command relating to a single connection of the base station to the base station, converts the information to be presented as a predetermined training sequence, and the receiver of the base station comprise means used for converting the training sequence identified in the received signal to the transmitting power control command that the subscriber terminal wanted to transmit to the base station.

18. The system as claimed in claim 15, wherein the transmitter comprises means used in packet transfer for converting the numbering information of bursts, packets or other data blocks to be presented as a predetermined training sequence, and the receiver comprises means used for converting the training sequence identified in the received signal to numbering information of bursts, packets or other data blocks.

19. The system as claimed in claim 18, wherein the transmitter has means for providing two successive bursts with different training sequences.

20. The system as claimed in claim 18, wherein the packet consists of bursts, and the transmitter has means for providing the bursts of the packet each with the same training sequence, and for providing two successive packets with a different training sequence.

* * * * *